US006603761B1

(12) United States Patent
Wang et al.

(10) Patent No.: US 6,603,761 B1
(45) Date of Patent: Aug. 5, 2003

(54) USING INTERNET AND INTERNET PROTOCOLS TO BYPASS PSTN, GSM MAP, AND ANSI-41 NETWORKS FOR WIRELESS TELEPHONE CALL DELIVERY

(75) Inventors: Jin Wang, Lisle, IL (US); Patuardhana Babu Gorrepati, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/479,860

(22) Filed: Jan. 7, 2000

Related U.S. Application Data

(60) Provisional application No. 60/154,501, filed on Sep. 17, 1999.

(51) Int. Cl.$^7$ .............................................. H04L 12/66
(52) U.S. Cl. ...................... 370/352; 370/331; 370/466
(58) Field of Search ................................. 370/310, 325, 370/352, 354, 356, 331, 410, 522, 328, 338, 400–402, 351, 465–467; 455/433, 432

(56) References Cited

U.S. PATENT DOCUMENTS

| | | | | |
|---|---|---|---|---|
| 5,862,481 A | * | 1/1999 | Kulkarni et al. | 455/432 |
| 6,137,791 A | * | 10/2000 | Frid et al. | 370/352 |
| 6,195,705 B1 | * | 2/2001 | Leung | 709/245 |
| 6,222,829 B1 | * | 4/2001 | Karlsson et al. | 370/329 |
| 6,295,291 B1 | * | 9/2001 | Larkins | 370/352 |
| 6,359,880 B1 | * | 3/2002 | Curry et al. | 370/352 |
| 6,515,974 B1 | * | 2/2003 | Inoue et al. | 370/331 |
| 6,519,242 B1 | * | 2/2003 | Emery et al. | 370/338 |
| 6,519,252 B2 | * | 2/2003 | Sallberg | 370/356 |

OTHER PUBLICATIONS

Diffie, W. and Hellman, M., "New Directions in Cryptography," *IEEE Transactions on Information Theory*, vol. IT–22, Nov. 1976, pp. 644–654.
Perkins, "IP Mobility Support", Network Working Group, RFC 2002, Oct. 1996.
Droms, "Dynamic Host configuration Protocol", Network Working Group, RFC 2131, Mar. 1997.
"A Primer of the H.323 Series Standard", DataBeam Corporation, May 15, 1998.
"Packet–Based Multimedia Communications Systems" *Series H: Audiovisual and Multimedia Systems—Infrastructure of audiovisual services—Systems and terminal equipment for audiovisual services*, International Telecommunications Union, ITU–T Recommendation H.323 (2/98).

* cited by examiner

Primary Examiner—Chau Nguyen
Assistant Examiner—Nittaya Juntima

(57) ABSTRACT

A method and system to provide GSM subscribers roaming into CDMA or TDMA networks, and CDMA or TDMA subscribers roaming into GSM networks, with basic call delivery wireless services as long as the roamers can pay the bill with their valid credit card, and to do so independently of and as a bypass of GSM Memorandum of Understandings for cellular/PCS services. This is achieved by integrating the proper pieces of wireless and wireline networks and secure communications, using IP networks and protocols as an alternative to the existing telephony-based approach.

64 Claims, 6 Drawing Sheets

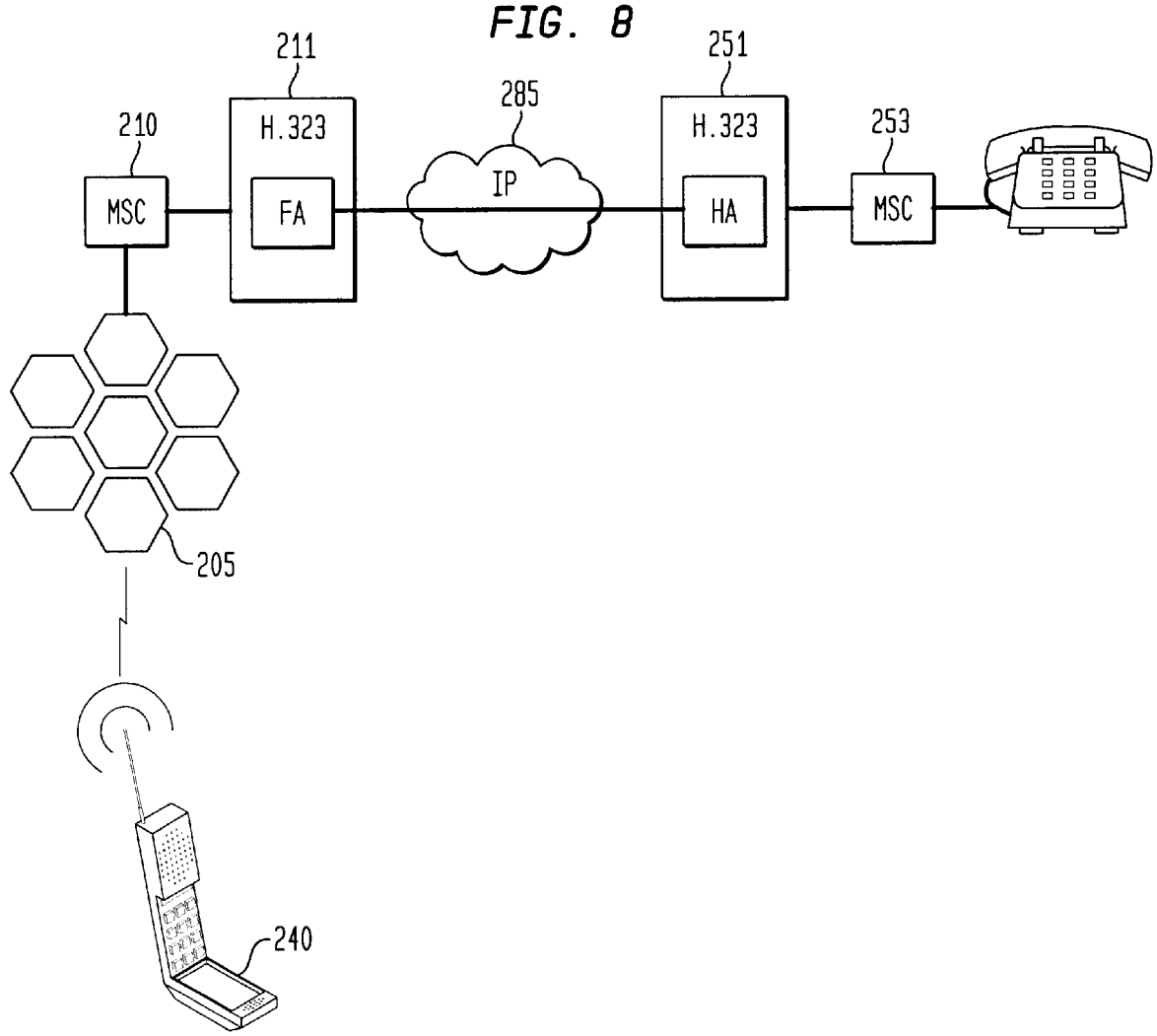

USING INTERNET AND INTERNET PROTOCOLS TO BYPASS PSTN, GSM MAP, AND ANSI-41 NETWORKS FOR WIRELESS TELEPHONE CALL DELIVERY

RELATED APPLICATIONS

This application is a continuation of provisional application serial No. 60/154,501 filed Sep. 17, 1999.

FEDERALLY SPONSORED RESEARCH OR DEVELOPMENT

Not Applicable.

BACKGROUND OF THE INVENTION

This invention relates to cellular call delivery services provided by cellular/PCS operators. Call delivery service permits a cellular subscriber to receive phone calls either in a home network (e.g., London) or while away from the home network (e.g., in Chicago).

Global Systems for Mobile Communications (GSM) is a widely popular Time Division Multiple Access (TDMA)-based standard used in Europe, China, selected parts of the United States, and other parts of the world. TDMA is a digital wireless technology.

A GSM subscriber who roams to Code Division Multiple Access (CDMA) wireless networks or other Time Division Multiple Access (TDMA) networks may be denied wireless services even if the subscriber's mobile device is capable of multi-mode (TDMA, CDMA, or analog, and GSM) operation, and the subscriber has the ability to pay for wireless calls with his/her valid credit card. The basis for the denial of service is simply because there does not exist a GSM Memorandum of Understandings (MoU) between the home GSM network and visited CDMA network for billing settlement. Similarly, a CDMA or TDMA subscriber who roams to GSM wireless networks may be denied wireless services even if that subscriber's mobile device is also capable of multi-mode operation, where again the basis for the denial of service is simply because there does not exist a GSM Memorandum of Understandings (MoU) between the home CDMA or TDMA network and visited GSM network for billing settlement.

The existing infrastructure uses at least two disparate networks to implement call delivery service to roaming wireless users. A first network is a control and signaling network that links authorization centers, billing centers, location tracking, and so forth. Examples of control networks include GSM MAP networks and ANSI-41 networks. A second network is a voice network that links calls from one location to another. The Public Switched Telephony Network (PSTN) is one example of a widespread voice network used to transmit calls from one location to another. In the present practice, the control and signaling network is used to track the location of a mobile device, and when a call must be delivered to the mobile device, the PSTN network is used to route the call itself.

1. Field of the Invention

This invention relates to cellular telephony and the use of Internet Protocols and IP networks to replace traditional telephony setup infrastructure for roaming cellular users. This invention also relates to the field of providing mobile wireless telephone service for users roaming outside their own predefined service area. This invention also relates to the field of interoperability of CDMA and GSM/TDMA cellular networks.

2. Description of Related Art

A GSM MoU is an agreement between a consortium of GSM wireless service providers to coordinate billing settlement via a GSM MAP network. For example, a subscriber of a first GSM service provider may roam to a service area controlled by a second GSM service provider. An established MoU allows the first GSM service provider to still serve the subscriber while that subscriber is in the service area corresponding to the second GSM service provider. In practice, the second GSM service provider gets paid a portion of the service/roaming charge the first GSM service provider charges the subscriber, which is one reason wireless "roaming charges" are so expensive.

GSM MoU can also be used to coordinate billing settlement between GSM and CDMA (or TDMA) service providers. For example, a subscriber of a GSM service provider may roam to a service area controlled by a CDMA service provider. Assuming the user has a mobile device capable of multi-mode (in this example, GSM and CDMA) operation, an established MoU allows the GSM service provider to still serve the subscriber while that subscriber is in the service area corresponding to the CDMA service provider. In practice, the CDMA service provider gets paid a portion of the service/roaming charge the GSM service provider charges the subscriber.

The Local Number Portability (LNP) feature could be used, to some extent, to bypass the lack of a GSM MoU. LNP allows a telephone subscriber to "port" his/her phone number when that subscriber relocates to a different region of the country, even when the local area code may be different (e.g., a subscriber may reallocate from Chicago to New York, but still keep the original phone number used in Chicago that has an area code of 312).

However, LNP updates are not dynamic by design and thus can have serious limitations. A subscriber who wants LNP typically will request that service by filling out a form. The phone company's administrative staff will manually process the form and make necessary updates of various databases to effect the requested LNP. Note that LNP is designed to support occasional change of location/relocation, and is typically done manually; thus, there is a scalability issue in practice.

Public Switched Telephony Network (PSTN) refers to the public phone networks as we know them. PSTN is composed of switches and T1/E1 trunks, central office, etc. PSTN uses circuit-switched technology, in which necessary resources are allocated (dedicated) for the duration of a phone call. An IP network (e.g., the Internet), in contrast, is composed of nodes of computers, serves, routers, and communications links, etc. It employs packet-switching technology that decomposes data (e.g., voice, web pages, an e-mail message) into IP packets. Each packet is then transmitted over an IP network to a destination identified by an IP address and reassembled at the destination. An IP transmission is completed without pre-allocating resources from point to point.

H.323 is a (long) list of standards that supports "voice over Internet" (or voice over IP) and multimedia over Internet. As of the date of this disclosure, the URL databeam.com has further information on the H.323 standards. H.323-based packet calls can bypass some portion of telephony infrastructure, but H.323 does not provide for mobility and radio resource usage is inefficient if IP packets are carried over the radio link.

Mobile IP is described by Internet Engineering Task Force (IETF) Request for Comments (RFC) number 2002. As of the date of this disclosure, RFC 2002 may be obtained from URL nic.mil/ftp/rfc/rfc2002.txt. Unlike H.323, Mobile IP does support packet mobility, but smooth handoffs—as smooth as circuit cellular voice—are not supported.

One known commercial use of Mobile IP is deployed by Nextel, a wireless service provider. Using a cellular mobile phone by Motorola Corporation of Schaumburg, Ill., under the tradename iDEN 1000, Nextel allows subscribers to access digital data from the Internet via Mobile IP.

The Diffie-Hellman algorithm is a math method allowing two parties to establish a temporary secret for secure transmission of information. Reference: Diffie, W. and Hellman, M., "New directions in cryptography," *IEEE Transactions on Information Theory*, Vol. IT-22, November 1976, pp. 644–1654.

BRIEF SUMMARY OF THE INVENTION

This invention addresses the above issues of denial of service by combining and integrating the proper pieces of circuit and packet, and that of wireless and wireline. This invention provides a way to bypass SS7 networks, GSM MoU, IS-41, and PSTN so that GSM users roaming into analog, TDMA, or CDMA networks, and CDMA users roaming into GSM, TDMA, or analog networks, and TDMA users roaming into GSM, CDMA, or analog networks, each having the ability to pay cellular calls with his/her credit card, can be provided with basic call delivery cellular services.

These and other aspects and attributes of the present invention will be discussed with reference to the following drawings and accompanying specification.

BRIEF DESCRIPTION OF THE DRAWINGS

FIG. 7 illustrates a data structure supporting a mapping operation of the present invention in the voice and data service provider's network; and FIG. 8 illustrates the bypass function of the Mobile IP tunnel of the present invention.

DETAILED DESCRIPTION OF THE PREFERRED EMBODIMENT

Figure 1:
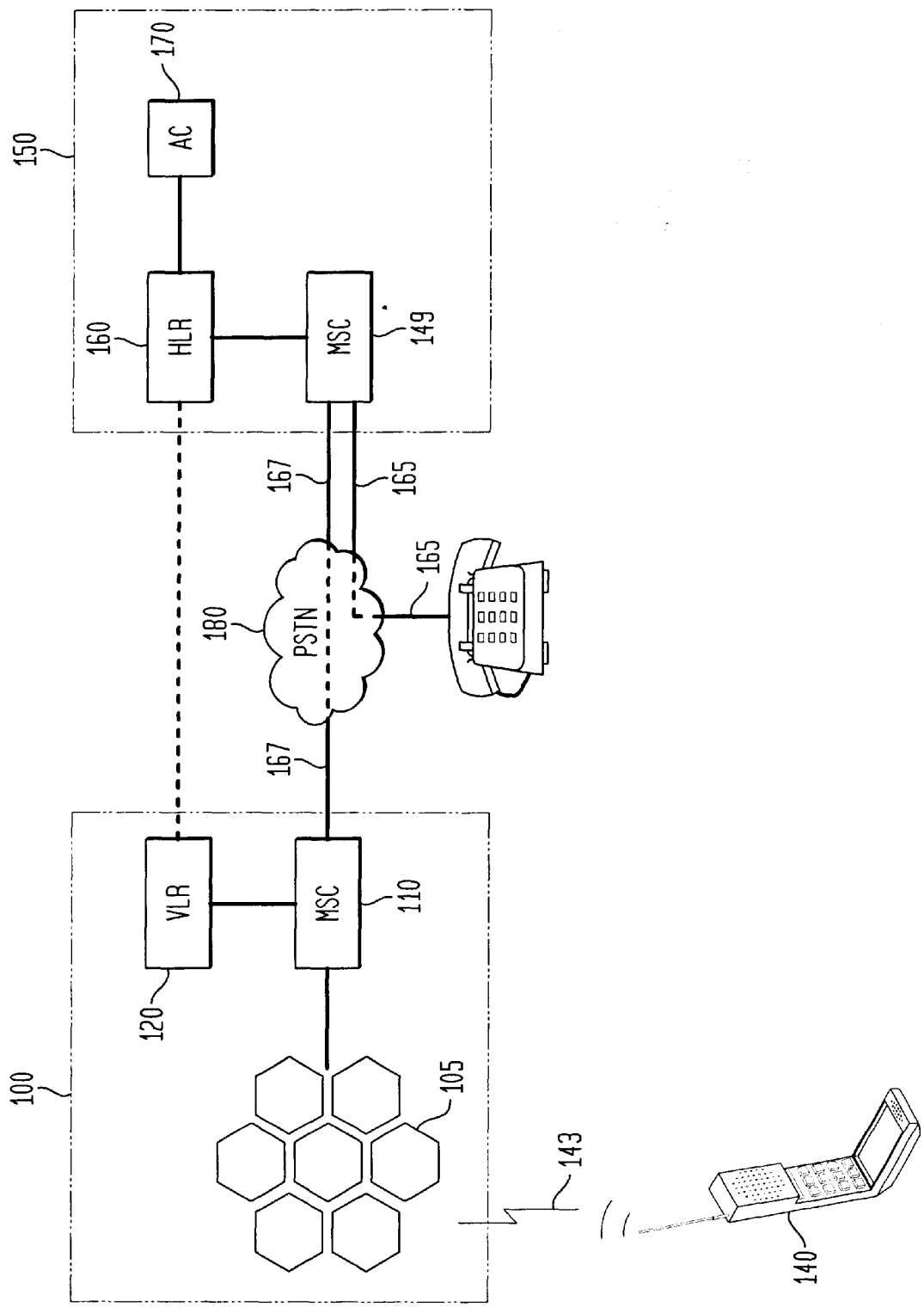
FIG. 1 represents prior art, the typical infrastructure supporting call origination and call delivery.

While this invention is susceptible of embodiment in many different forms, there is shown in the drawings, and will be described herein in detail, specific embodiments thereof with the understanding that the present disclosure is to be considered as an exemplification of the principles of the invention and is not intended to limit the invention to the specific embodiments illustrated.

Cellular telephone users generally subscribe to a wireless service provider. The subscriber may use their mobile devices within the home wireless network served by their wireless service provider in exchange for subscription fees. However, users also may travel, and thus need to have their mobile devices operate outside of their home wireless networks as they visit other areas.

FIG. 1 shows a typical wireless infrastructure that provides cellular/PCS services like call origination and call delivery for a roaming mobile device. For call delivery, the visited network 100 tracks the location of a roaming user and the Visitors Location Register (VLR) 120 reports that location information via a control network to the Home Location Register (HLR) 160 of the home network 150. Control networks may include ANSI41 and GSM MAP types of networks. An Authentication Center (AC) 170 in the home network 150 is used for user registration and authentication, e.g., checking to see, among other things, if the user has made payments. When a call 165 relayed from the Public Switched Telephony Network (PSTN) 180 to the home MSC 149 is to be delivered to a subscriber, the home Mobile Switching Center (MSC) 149 consults the HLR 160 to determine the current whereabouts of the current VLR 120, and the call is then directed via links 167 and the PSTN 180 to the visited Mobile Switching Center (MSC) 110 currently serving the mobile device.

An MSC is a telephone switch specialized for wireless and mobility support. An MSC performs various functions, including mobility management, call handoffs, call admission, call control, resource allocation, and so forth. The call is then relayed from the MSC 110 to base stations 105 and via wireless communications 143 to the mobile device 140.

Since the visited network 100 and home network 150 may be operated by different wireless operators, certain kinds of business roaming agreements are necessary for things like billing settlement. In GSM networks, a GSM Memorandum of Understanding (MoU) serves that purpose. In CDMA networks, an ANSI-41 roaming business agreement serves that purpose.

Table 1 summarizes the current cellular/PCS technologies and the network elements that are involved in call origination and call delivery.

TABLE 1

| Cellular Value Proposition | Current Supporting Cellular/PCS Technologies |
|---|---|
| Wireless and mobility | Base stations, RF engineering, hard and soft handoffs |
| Wide Coverage Area | Automatic roaming across visited and home wireless networks using VLR/HLR/AC US: ANSI-41 and business roaming agreements GSM: GSM MAP and GSM Memorandum of Understandings |
| Reliable services of both voice/data call origination voice/data call delivery | Call origination: involves VLR, HLR, and AC for service qualification, user service profile, and billing. Call delivery: involves VLR and HLR for mobile location tracking, Temporary Local Directory Number (TLDN) assignment, call forwarding/routing, and billing. |

A problem occurs when a GSM user, who roams to a CDMA (or TDMA) network, may not be provided with cellular services because there lacks a GSM Memorandum of Understanding (MoU) between the home GSM network and visited CDMA network. A similar problem occurs when a CDMA (or TDMA) user, who roams to a GSM network, may not be provided with cellular services because there lacks a GSM Memorandum of Understanding (MoU) between the home CDMA (or TDMA) network and visited GSM network. This is so even when the user's mobile device is capable of multi-mode (TDMA, CDMA or analog, and GSM) operation and thus there is no technology, barrier, and the user has the ability to pay for cellular calls (e.g., call delivery) with his/her valid credit card.

A CDMA (or TDMA) network typically is capable of CDMA and analog air interfaces. Support of analog in the network (in addition to CDMA) allows the service provider to offer service and coverage to existing/"old" analog cellular phones. A CDMA (or TDMA) mobile device or phone typically is capable of using both CDMA and analog air interfaces. Support of the analog air interface in the mobile device or phone allows the user to still have cellular service when that user roams to a cellular network that supports only analog air interface, and in the case where analog is the only interface compatible between the mobile device and the instant cellular network.

A GSM network typically does not support analog air interfaces, therefore a GSM user roaming to a CDMA (or TDMA) network will require a mobile device that supports the GSM air interface and at least one of CDMA (or TDMA) and analog air interfaces.

Similarly, for a CDMA (or TDMA) user roaming to a GSM network, the user will require a mobile device that supports CDMA (or TDMA, respectively) air interfaces, possibly an analog air interface, plus a GSM air interface.

For a TDMA user roaming to a CDMA network, and for a CDMA user roaming to a TDMA network, the mobile device must support the TDMA air interface and at least one of the CDMA and analog air interfaces.

The present invention combines the following technical components to bypass GSM MoU and PSTN for call delivery: (1) use of Mobile IP to track the location of mobile users; (2) use of H.323-based voice-over-IP to transport packet voice over Mobile IP tunnels; (3) use of H.323 servers in the visited network to convert packet voice to circuit voice; (4) use of the user's credit card as a payment method; and (5) use of the Diffie-Hellman algorithm to encrypt the user's credit card information for over-the-air transmission.

The use of H.323 servers in the visited network to convert packet voice to circuit voice leverages the existing smooth handoffs capability of circuit cellular voice and the well-engineered CDMA/TDMA/GSM circuit-mode air interface that provides superior efficiency of radio resource usage. The conversion also allows the roamer to receive call delivery with an existing mobile device as opposed to having to purchase a new kind of "packet phone."

A wireline/landline voice user can today use "voice-over-IP", which bypasses a PSTN, for voice service. Since the user's location is fixed, there is no such issue as user's location tracking (e.g. for call delivery).

In contrast, for a wireless voice user who can be in a constant motion (e.g. moving from a coverage area associated with one visited wireless network to an adjacent/neighboring coverage area associated with a different visited network), the system must track the current location of the user. Traditionally, location tracking for call delivery is through interactions between the VLR and HLR as shown in FIG. 1.

One reasonable summation of the present invention is, in a sense, "voice-over-Mobile-IP" for wireless voice users. Per Mobile IP standards as referenced in RFC 2002, when a user moves to a different area, the user's mobile device (capable of Mobile IP) will send, via a Foreign Agent (FA), Mobile IP registration/re-registration messages to the user's Home Agent (HA), so the HA will know the whereabouts of the user (i.e. the FA that is currently serving the user). Thus the HA must track the IP address of the FA currently serving the roaming user.

Many of the same reference numbers are used in FIGS. 2 through 8 to identify common features. It is to be understood that where the same number is used, it refers to the same feature in each of the drawings.

Figure 2:
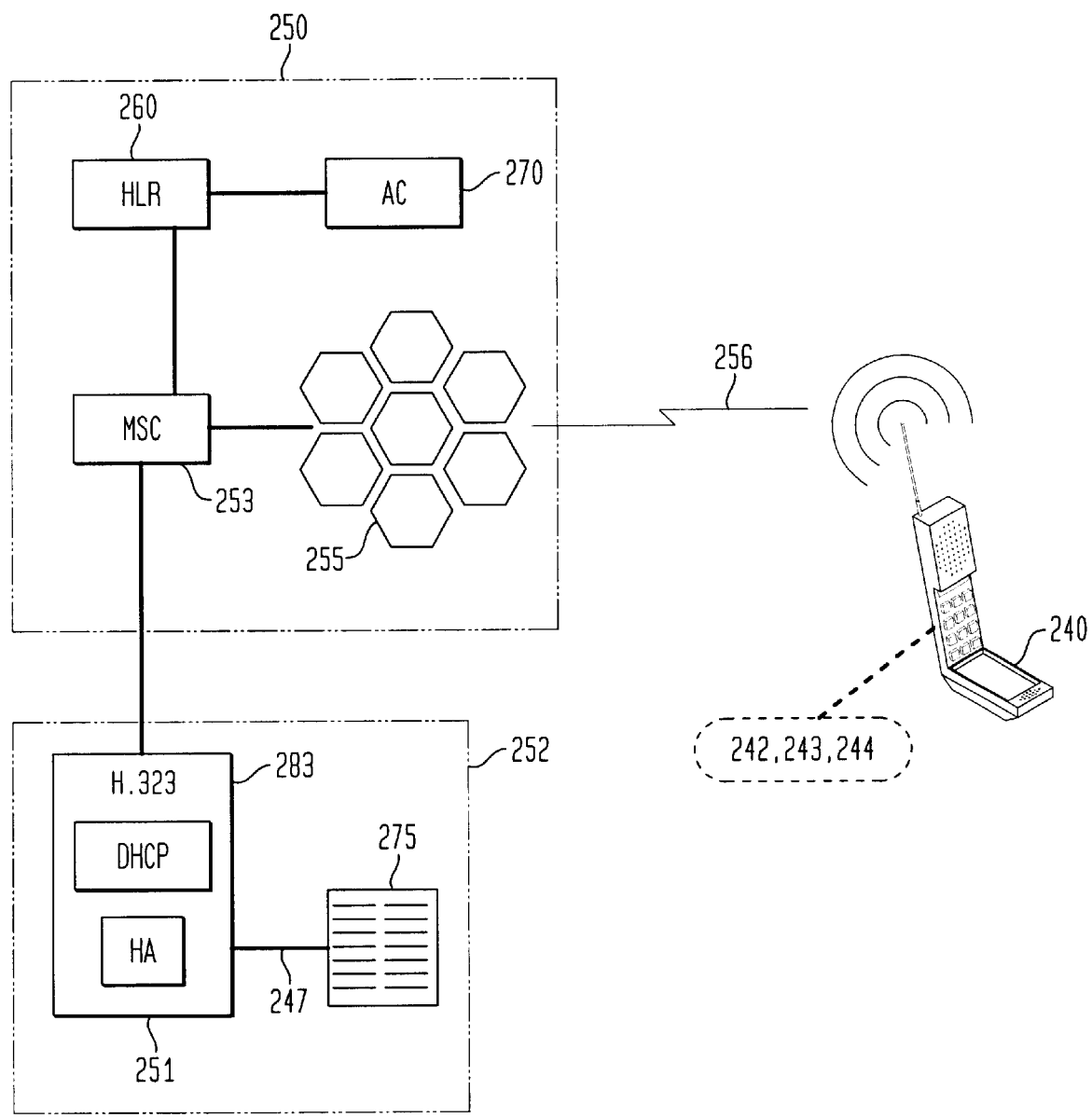
FIG. 2 represents an infrastructure supporting the first step of call delivery in the present invention.

FIG. 2 shows the first step of call delivery, in one embodiment of the present invention, wherein prior to roaming, the mobile device 240 sets up call forwarding from the home wireless network 250 to a voice and data service provider's network 252. The voice and data service provider can be an Internet service provider (ISP). The voice and data service provider's network 252 comprises at least a home H.323 server 251 that provides a telephone number 242 to the user's mobile device 240 for call forwarding. The home H.323 server 251 also acts as Mobile IP home agent (HA) and provisions a Mobile IP shared secret 243 and the IP address 244 of the HA into the user's mobile device 240.

Note that the provisioning of the Mobile IP shared secret 243 cannot be done via wireless communication 256 with base stations 255, because the Mobile IP shared secret will be revealed during such a transmission and will no longer be a secret. Mobile IP shared secret provisioning can be done through other means. In a preferred embodiment, when the user subscribes to the voice and data service provider, the user will be informed of the IP address 244 of the HA in the voice and data service provider's network and the Mobile IP shared secret 243 assigned to him. This information may be accompanied with instructions how to enter this information into the user's mobile device as part of the subscription setup.

Home Agent (HA) and Foreign Agent (FA) are Mobile IP concepts and network elements introduced in RFC 2002. Their functionality and operation are described in detail in RFC 2002 and not detailed further herein.

Figure 3:
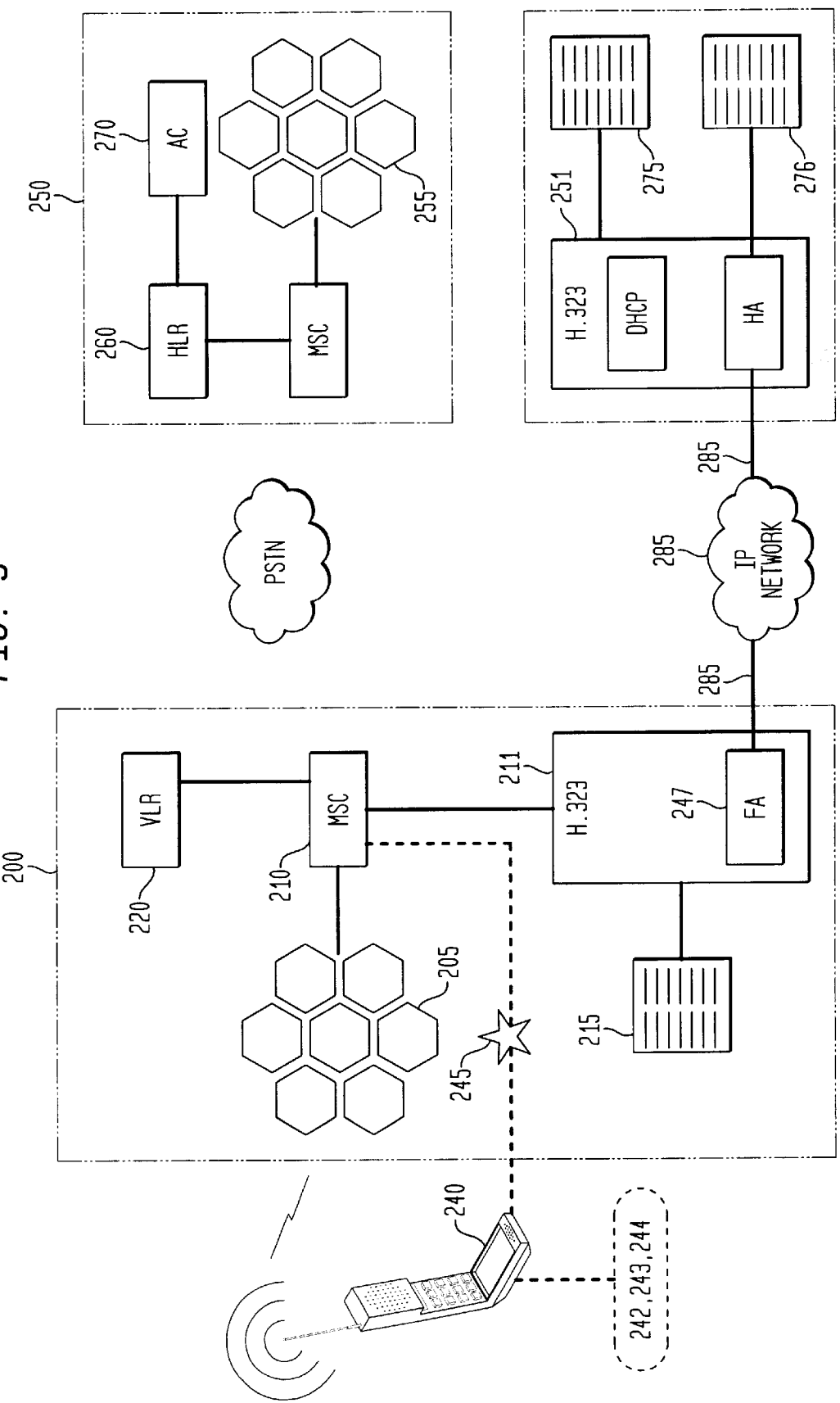
FIG. 3 represents an infrastructure supporting the second step of call delivery in the present invention.

FIG. 3 shows the second step of call delivery in one embodiment of the present invention, wherein the user's mobile device 240 is roaming in a visited wireless network 200. As the user powers on the mobile device 240, the mobile device registers with the visited wireless network 200, which may be any type of wireless network including cellular or PCS. This registration permits the visited wireless network 200 to track the mobile's location and perform call delivery, but does not imply conventional VLR 220/HLR 260 interaction. In the present invention, the roamer's HLR 260 and the roamer's AC 270 in the home wireless network 250 are not contacted for call delivery. The registration conveys the mobile device's International Mobile Subscriber Identifier (IMSI), the forwarding phone number 242 assigned by the voice and data service provider, and the IP address 244 of the HA, and signature signed by the Mobile IP shared secret 243 to the visited MSC 210 via the base stations 205.

With the roamer's IMSI, forwarding number 242, and HA, IP address 244, the visited MSC 210 identifies the mobile device 240 as a special device supporting the present invention. This special identification aborts the conventional VLR/HLR interaction. The visited MSC and the mobile device interact with each other to establish a temporary shared secret 245 using the Diffie-Hellman algorithm. This mechanism is also used in Cellular Digital Packet Data (CDPD) networks typically used for low speed packet data services. The user's credit card information is transmitted from the mobile device 240 to the visited wireless network 200 via wireless communication with base stations 205 using the established temporary shared secret 245. The shared secret 245 permits the sensitive information of the user's credit card information to be relayed to the visited wireless network 200 securely.

The credit card information can be entered by the user on the mobile device keypad, or via a swipe of the card through a card reader slot on the mobile device, or via some other means. In one embodiment, the credit card information is optionally stored within the mobile device. In another embodiment, the credit card information must be entered by the user for each use. In another embodiment, the user selects a credit card number from a list to be used for the outgoing call. The credit card number may belong to the user, the user's employer, or another third party. The credit card number thus relayed securely is then verified by the visited network's billing server to ensure it is valid, using methods familiar to anyone exposed to credit card payments and transactions.

After credit card verification, the visited MSC 210 contacts the visited H.323 server 211. The visited H.323 server 211 also acts as a Mobile IP Foreign Agent (FA) which contacts the home H.323 server 251, via the HA IP address 244, to request an IP address to be assigned to the mobile device by home H.323 server 251 in the voice and data service provider's network 252.

The request contains a signature so that the HA in the home H.323 server 251 is able to authenticate the request by making sure that the requestor is indeed one of the subscribers of the voice and data service provider's network 252. Signature authentication is required because otherwise it would be possible for a third party (attacker) to fraudulently impersonate the user's mobile device 240 and attempt to request IP addresses again and again, potentially depleting the IP address pool managed by the home H.323 server 251 in the voice and data service provider's network 252.

In response to the request containing a signature, a dynamic IP address 247 is allocated by the home H.323 server 251 which also provides DHCP service.

DHCP is covered by RFC 2131. As of the date of this disclosure, RFC 2131 may be obtained from URL http://nic.mil/ftp/rfc/rfc2131.txt. The major use of DHCP is to support dynamic IP address assignment For example, an ISP (Internet Service Provider) can use DHCP to dynamically assign an IP address to a subscriber after he/she logs in over a dial-up connection; once the session is over, the IP address is recycled for other dial-in users.

The dynamic IP address 247 from the home H.323 server 251 is relayed back to the FA of the visited H.323 server 211. The FA relays the dynamic IP address to the user's mobile device 240 during the IP Configuration Protocol (IPCP) phase of Point-to-Point Protocol (PPP) initialization.

The mobile device initiates a Mobile IP registration request with the HA in the home H.323 server 251 via the FA in the visited H.323 server 211. The HA authenticates the request using the Mobile IP shared secret 243 provisioned by the HA in the first step of the present invention, prior to the user roaming. Per the MD5 algorithm of Mobile IP, the Mobile IP registration request from the mobile device is signed using the provisioned Mobile IP shared secret 243, which permits verification of both message content and sender by the HA. A detailed technical discussion of the MD5 algorithm may be located in RFC 2002 which pertains to support of Mobile IP. Successful verification and receipt of an acknowledgement response by the mobile device from the HA completes the establishment of a Mobile IP tunnel 285.

Upon successful setup of the Mobile IP tunnel 285, the home H.323 server 251 in the voice and data service provider's network 252 updates the HA mobility binding table 276 associated with Mobile IP and updates its phone-number-to-IP-address table 275 that maps the user's forwarding phone number 242 provided by the home H.323 server 251 to the dynamic IP address 247 now assigned to the user's mobile device 240. The visited H.323 server 211 in the visited wireless network 200 similarly updates its IP-address-to-phone-number table 215 that maps the dynamic IP address 247 of the mobile to the forwarding phone number 242 provided by the home H.323 server 251. When establishment of a Mobile IP tunnel 285 is complete, the HA mobility binding table 276 is updated, and both H.323 servers' tables 215, 275 are updated, the setup for the GSM MoU and the PSTN bypass of the present invention is complete.

The Mobile IP tunnel 285 is one example of bypassing the usual interaction between the VLR and the HLR/AC, as well as bypassing the PSTN, both as used in the present invention. In a preferred embodiment, the Mobile IP tunnel is established within a public IP network such as the Internet. In alternate embodiments, the Mobile IP tunnel may be established within a private IP network, or a combination of both private networks and the public Internet. In another embodiment, the Mobile IP tunnel may be layered on top of a different network infrastructure, in a manner consistent with current network practice.

An IP tunnel is a specific case of a general network tunnel, which typically has two ends, and encapsulates packets of a first protocol for transmission from the first end to the second end of the tunnel using a potentially different second protocol for actual routing and delivery. Setting up a network tunnel generally involves a server or agent setting up each end prior to use. IP tunneling allows Internet standard-based routers to route IP packets from one end of a tunnel to the other end of the tunnel, regardless of the topology of the underlying IP network. A detailed technical discussion of IP tunneling may be located in RFC 2002 which pertains to support of Mobile IP.

Figure 4:
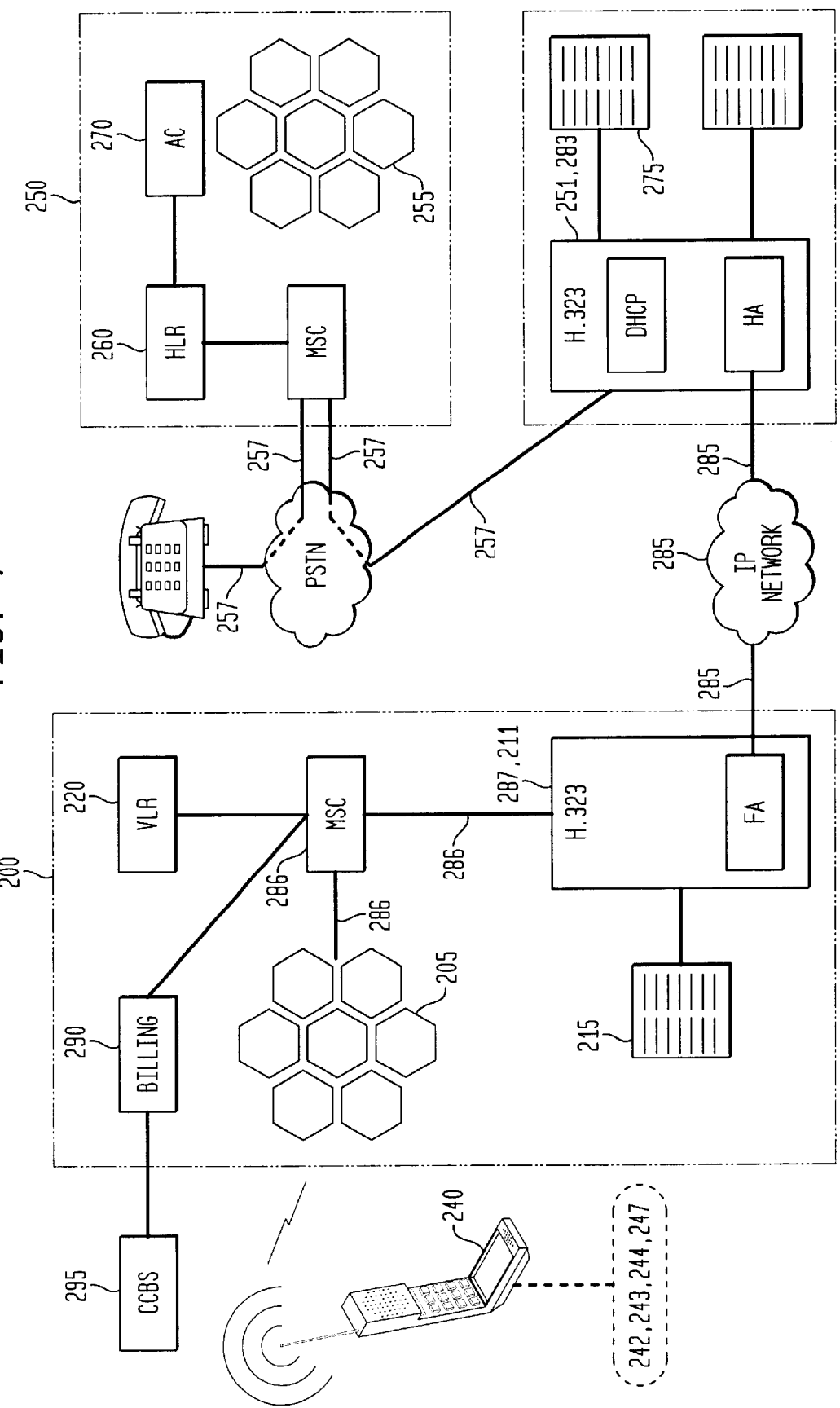
FIG. 4 represents an infrastructure supporting the third step of call delivery in the present invention.

FIG. 4 shows the last step of call delivery in one embodiment of the present invention. An incoming call 257 to the user is forwarded by the home wireless network 250 to the forwarding phone number 242 associated with the home H.323 server 251. The home H.323 server 251 looks up the phone number 242 in its phone-number-to-IP-address table 275 and finds the dynamic IP address 247 that has been assigned to the user's mobile device 240.

The home H.323 server 251 converts 283 the circuit call 257 to a packet call (i.e., voice-over-IP) and forwards the packets to the HA. The HA forwards the packets over the Mobile IP tunnel 285 established in the second step to the FA in the visited H.323 server 211.

The visited H.323 server 211 in the visited wireless network 200 looks up the dynamic IP address 247 in its IP-address-to-phone-number table 215 and finds the forwarding phone number 242 that has been assigned to the user's mobile device 240 for roaming.

The FA in the visited H.323 server 211 converts 287 the packets received via the Mobile IP tunnel 285 to a circuit call 286 and relays the circuit call to the visited MSC 210. The visited MSC 210 forwards the circuit call 286 on to the wireless base stations 205 for over-the-air transmission to the user's mobile device 240.

In a preferred embodiment, both the conversions 283, 287 by H.323 servers 251, 211 are performed in each of the respective home and visited wireless provider's networks 250, 200, thus supporting speaking and listening by both the calling and called party. Specifically, the home H.323 server 251 performs conversion 283 for circuit voice originating from a call 257 to be conveyed via the Mobile IP tunnel 285, and performs conversion 287 for voice packet data conveyed via Mobile IP tunnel 285 from the user to be delivered as circuit voice to caller 257. Similarly, the visited H.323 server 211 performs conversion 283 for circuit voice originating from the wireless connection with the base stations 205 to be conveyed via the Mobile IP tunnel 285, and performs conversion 287 for voice packet data conveyed via Mobile IP tunnel 285 from the call 257 to be delivered via wireless communication from base stations 205 to the user's mobile device 240. In this embodiment, packet data is conveyed via the Mobile IP tunnel 285, and is converted appropriately to circuit calls by the H.323 servers 251, 211 at each end appropriately for interface to wireless (or in the case of the home wireless network 250, wireline) communications.

When the call is terminated, billing information is collected in the visited network's billing server 290. The billing information may include but is not limited to at least one of the duration of the call, which credit card number was used, identification of the IP tunnel, time and date, and other kinds of billing data. At the end of a billing period, or when the accumulated bill amount exceeds some predetermined amount, or when additional services or processing fees may be imposed, or at some other preferential time, the visited network's billing server 290 interacts with the credit card's billing server 295 for billing settlement, using the traditional and well-understood practices for accounting for services rendered. In the present invention, the roamer's HLR 260 and the roamer's AC 270 are not contacted for call delivery by the VLR 220.

Figures 5, 6:
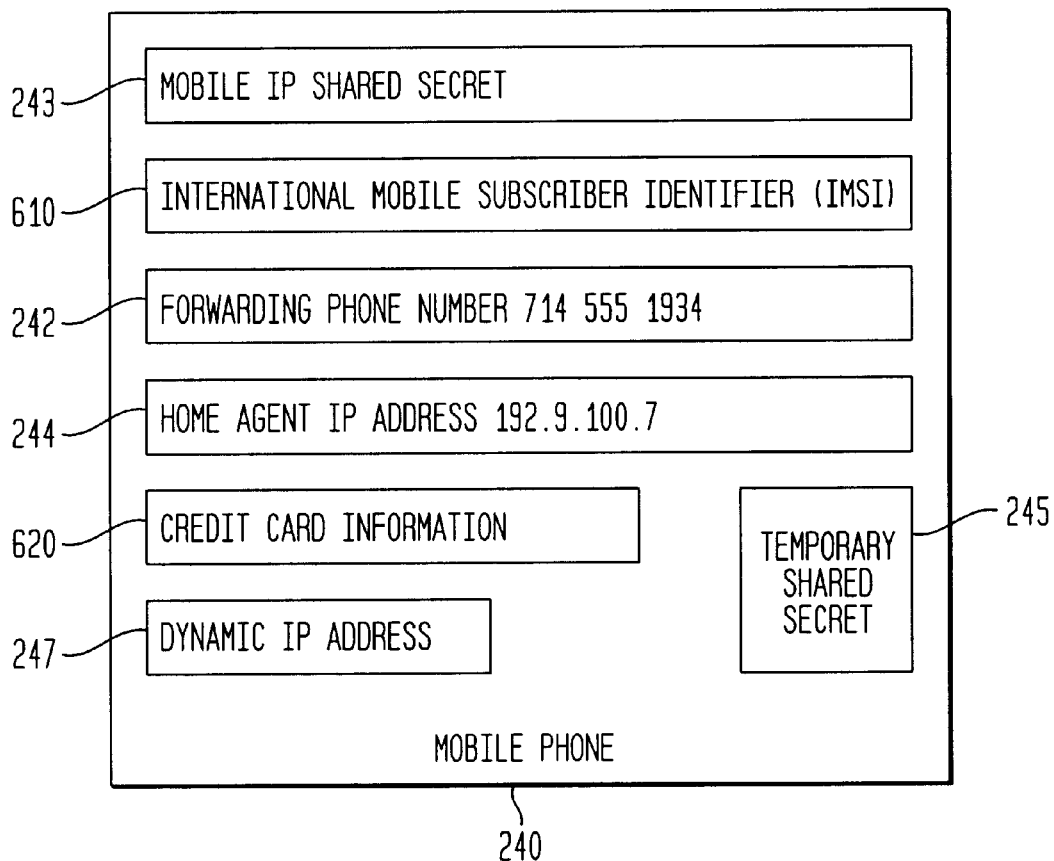
FIG. 5 illustrates a data structure supporting a mapping operation of the present invention in the visited wireless network.
FIG. 6 illustrates data structures in the user's mobile device utilized by the present invention.

FIG. 5 illustrates a data structure supporting the IP-address-to-phone-number table 215 of the present invention in the visited wireless network. The table 215 consists of associated pairs of entries, wherein each line in the table contains one IP address and one phone number. A selected IP address 510 is used to index within the list of IP addresses 520 in the table, thus selecting a particular record or line 530. The corresponding phone number 540 in the line 530 is the data retrieved from the table 215. The IP address 510 is said to "map to" the forwarding phone number 540, uniquely from the list of phone numbers 550 in the table 215.

FIG. 6 illustrates data structures in the user's mobile device 240 required for the present invention. One of the data structures is the International Mobile Subscriber Identifier (IMSI) 610 that uniquely identifies the user's mobile device. Provisioned into the mobile device by the voice and data service provider are the forwarding phone number 242, the Mobile IP shared secret 243, and the IP address 244 of the HA in the home H.323 server. In the second step of the present invention, the temporary shared secret 245 is established within the mobile device 240 to permit the sensitive information of the user's credit card information to be relayed to the visited network securely. Credit card information 620 may be stored within the user's mobile device, or it may be entered by the user as required. The leased dynamic IP address 247 is used to establish the second end of the Mobile IP tunnel 285 as shown in FIG. 8.

FIG. 7 illustrates a data structure supporting the phone-number-to-IP-address table 275 as shown in FIGS. 3 and 4 of the present invention in the home wireless network. The table 275 consists of associated pairs of entries, wherein each line in the table contains one phone number and one IP address. A selected phone number 710 is used to index (within the list of phone numbers 720) in the table, thus selecting a particular record or line 730. The corresponding IP address 740 in the line 730 is the data retrieved from the table 275. The forwarding phone number 710 is said to "map to" the IP address 740, uniquely from the list of IP addresses 750 in the table 275.

FIG. 8 illustrates the bypass function of the Mobile IP tunnel of the present invention. The home MSC 253 in the home wireless network 250 relays the inbound call 257 to the home H.323 server 251, which converts (283, 287) the call to packets that are conveyed via the IP tunnel 285. The packet data is converted (283, 287) back to circuit voice by the visited H.323 server 211 and conveyed to the visited MSC 210 for over the air transmission from the base stations 205 to the mobile device 240. The normal interaction of the VLR and the HLR/AC is not used, effectively bypassing the network traditionally used for such interaction. The Public Switched Telephony Network (PSTN) as traditionally used to convey calls between wireless service providers (e.g., home wireless network 250 and visited wireless network 200 of FIG. 4) is not used in the present invention, and is thus also effectively bypassed. As a result, this invention provides for call delivery to GSM subscribers who roam from their home GSM networks to CDMA networks, and call delivery to CDMA subscribers who roam from their home CDMA networks to GSM networks, by using IP tunnels to convey the calls to be delivered.

The present invention includes a method to bypass Global Systems for Mobile Communications (GSM) Memorandum of Understanding (MoU) to provide basic cellular call delivery service. The basic cellular call delivery service uses an Internet Protocol (IP) tunnel. The IP tunnel includes a first end and a second end. A user having a mobile device subscribes to a home wireless service provider, and that provider serves a home wireless network in which the user can place and receive cellular calls. When that user travels outside of their home wireless network, they are said to be roaming.

When roaming, a user may be in an area served by a visited wireless service provider. The visited provider serves a visited wireless network distinct and separate from the home wireless network. In the situation where there does not exist a pre-arranged GSM MoU between the home wireless service provider and the visited wireless service provider the user can still obtain basic call delivery service if the user has a payment means to pay for the basic visited wireless network call delivery service.

A step in the preferred embodiment of the present method of the invention has the user registering with a voice and data service provider. This registration establishes the first end of the IP tunnel. This registration uses a home H.323 server in the voice and data service provider's network. The home H.323 server in the voice and data service provider's network is enhanced to further have the ability to provide Home Agent (HA) service.

Another step in the preferred embodiment of the present method of the invention identifies the user's payment means to the visited wireless service provider. The typical payment means is a credit card, and the credit card information must be securely transmitted from the user to the visited wireless service provider. To securely transmit this information, the mobile device and the visited wireless network establish a Diffie-Hellman temporary shared secret. With the secret in place, the user's credit card information can be transmitted securely to the visited wireless service provider, and upon receipt the visited wireless service provider can verify the validity of the user's credit card information.

Another step in the preferred embodiment of the present method of the invention is to register with an H.323 server in the visited wireless network. The H.323 server in the visited wireless network further has the ability to provide Foreign Agent (FA) service. This registration permits the second end of the IP tunnel to be established to the user's mobile device.

Another step of the preferred embodiment of the present method of the invention is to deliver calls to the user's mobile device, with the calls being conveyed as data via the IP tunnel. As services are rendered to the user, billing information is compiled and collected by the visited wireless service provider. The visited wireless service provider then bills the user based on the billing information collected and the user's credit card information.

The credit card information for the user can be stored within the mobile device by someone other than the user. Alternatively, it can be entered by the user directly. In a preferred embodiment, the credit card information is keyed into the mobile device. In another embodiment, the credit card information can be scanned or swiped into the mobile device using a card reader or similar apparatus.

The method of the present invention to establish the first end of the IP tunnel includes setting up call forwarding from the home wireless network to the voice and data service provider's network. This may involve obtaining a telephone number for forwarding, and/or obtaining an IP address corresponding to the Home Agent (HA). Additionally, a Mobile IP shared secret is set up with the voice and data service provider.

The method of the present invention to register with the visited wireless network to establish the second end of the IP tunnel further includes obtaining a dynamic IP address from the home H.323 server using DHCP. This dynamic IP address is then relayed to the visited H.323 server and then from the visited H.323 server via the visited wireless network to the user's mobile device. The user's mobile device can authenticate the Mobile IP connection by using the Mobile IP shared secret and the response from the HA of the home H.323 server. When complete and authenticated, the IP tunnel is established by the user's mobile device and then several tables are updated. These tables to be updated include a phone-number-to-IP-address table in the home H.323 server, a mobility binding table in the HA, and an IP-address-to-phone-number table in the visited H.323 server.

The method of the present invention to deliver calls to the user's mobile device via the IP tunnel further includes converting a circuit call to packets by the home H.323 server. These packets are forwarded over the IP tunnel, reassembled at the far end by the visited H.323 server, and then converted back into a circuit call for transmission to the user's mobile device. The transmission occurs in the visited wireless network. In a similar fashion to support bidirectional communication typical of a telephone conversation, the visited wireless network receives transmissions from the user's mobile device as a circuit call. This call is then converted to packets by the visited H.323 server. These packets are forwarded over the IP tunnel, reassembled at the far end by the home H.323 server, and then converted back into a circuit call for eventual connection to the entity that originally placed the call in the first place.

The method of the present invention to provide basic cellular call delivery service for a user having a mobile device and subscribing to a home wireless service provider serving a home wireless network is used when the user roams to visit an area served by a visited wireless service provider serving a visited wireless network distinct and separate from the home wireless network. If the user has a payment means to pay for the basic cellular call delivery service, the method includes establishing an Internet Protocol (IP) tunnel, having a first end and a second end. This tunnel is used for conveying IP packets in both directions between the first end and the second end.

Calls are delivered to the user's mobile device via the IP tunnel. Billing information is collected from the visited wireless network by the visited wireless service provider. The user is billed by the visited wireless service provider responsive to the billing information collected and the user's identified payment means. Accordingly, the user's payment means is identified to the visited wireless service provider. Setup of the IP tunnel is started by registering with the voice and data service provider to establish the first end of the IP tunnel at the HA within the voice and data service provider. Then the user registers with the visited wireless service provider to establish the second end of the IP tunnel at the FA.

The user's payment means may include credit card information. The step of identifying the user's payment means to the visited wireless service provider may include establishing a Diffie-Hellman temporary shared secret between the user's mobile device and the visited wireless network. The Diffie-Hellman temporary shared secret permits securely transmitting the user's credit card information to the visited wireless service provider via the visited wireless network. The visited wireless service provider can then verify the validity of the user's credit card information.

Registering with the user's home wireless service provider to establish the first end of the IP tunnel within the voice and data service provider's network may include setting up call forwarding from the home wireless network to the voice and data service provider's network. It may also include obtaining a Mobile IP shared secret from the voice and data service provider. Call forwarding setup may or may not be performed in or within the home wireless network. Setting up call forwarding may include obtaining a telephone number for call forwarding from the voice and data service provider. It may also include providing a home H.323 server by the voice and data service provider, and providing a Home Agent (HA) function within the home H.323 server. Generally, the user must obtain the IP address of the HA in the home H.323 server in the voice and data service provider's network. This address may be stored within the user's mobile device.

The step of registering with the visited wireless service provider to establish the second end of the IP tunnel may include providing a visited H.323 server in the visited wireless network. This visited H.323 server generally provides a Foreign Agent (FA) function. Dynamic Host Configuration Protocol (DHCP) in the voice and data service provider's network is used to obtain a dynamic IP address. The dynamic IP address is relayed from the HA via the visited wireless network to the user's mobile device. The user's mobile device authenticates the connection using the Mobile IP shared secret. Then the IP tunnel is established by the user's mobile device, and a number of tables are updated, including a phone-number-to-IP-address table in the home H.323 server, a mobility binding table in the HA, and an IP-address-to-phone-number table in the visited H.323 server as previously disclosed.

The system of the present invention provides basic cellular call delivery service via an Internet Protocol (IP)

tunnel. The IP tunnel has a first end and a second end. A user having a mobile device and subscribing to a home wireless service provider serving a home wireless network can travel outside of the home wireless network. When the user is travelling within the boundaries of a visited wireless network, the user is said to be roaming. If there does not exist a pre-arranged Global Systems for Mobile Communications (GSM) Memorandum of Understanding (MoU) between the home wireless service provider and a visited wireless service provider, the user can obtain basic call delivery service if that user has a means to pay for that service.

The system of the present invention may include a payment identification means for identifying the user's payment means to the visited wireless service provider. It also may include delivery service means for providing basic cellular call delivery service via the IP tunnel, responsive to the payment identification means. The delivery service means further may include a first end means to establish the first end of the IP tunnel within the home wireless network. The delivery service means further may include a second end means to establish the second end of the IP tunnel in the visited wireless network. The delivery service means further may include a circuit conversion means to convert circuit calls to the mobile device to packets for conveyance via the IP tunnel. The delivery service means further may include a packet conversion means to convert the packets conveyed by the IP tunnel to a circuit call. The IP tunnel is established between a foreign agent and a home agent, and is generally transparent to the mobile device.

The system of the present invention may include a home H.323 server in the voice and data service provider's network, and a visited H.323 server in the visited wireless network. The home H.323 server may include a phone-number-to-IP-address table and a mobility binding table. The visited H.323 server may include an IP-address-to-phone-number table. The system may include means to update the above disclosed tables, and any others that may be necessary.

The system of the present invention may include forwarding means for setting up call forwarding from the home wireless network to a voice and data service provider's network. The forwarding means is typically responsive to the user's mobile device. The system may also include mobile shared secret means for obtaining a Mobile IP shared secret from the voice and data service provider's network. The mobile shared secret means is also typically responsive to the user's mobile device. Typically, a telephone number for call forwarding is provided by the voice and data service provider responsive to the user's mobile device. Also, the IP address of the HA in the home H.323 server in the voice and data service provider's network is provided to the user's mobile device.

The system of the present invention may include DHCP means for obtaining a dynamic IP address from the home H.323 server. Typically, the dynamic IP address is relayed from the home H.323 server via the visited wireless network to the user's mobile device. The user's mobile device may then authenticate the connection by using the mobile shared secret means. Authenticating the connection permits an IP tunnel to be established. The system also monitors, collects, and compiles billing information in the visited wireless network for services rendered. This information can be used to bill the user's credit cards.

The system of the present invention can use credit card information entered into the user's mobile device. This information may be entered by other than the user. Alternatively, it can be keyed into the mobile device by the user for each use, or stored for a user selectable time period. Another way to enter the information is for the user to scan or swipe a credit card in an appropriate reader apparatus in the mobile device. The user's payment information can be relayed securely to the visited wireless service provider through the use of a Diffie-Hellman temporary shared secret.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A method to provide billing resolution and basic wireless call delivery service for a roaming user's mobile device, between a home wireless network supporting a home air interface technology and a visited wireless network supporting a visited air interface technology, the method comprising the steps of:

providing a home wireless network coupled to an existing Public Switched Telephony Network (PSTN) and a signalling network comprising at least one of an existing Global Systems for Mobile communication (GSM) Mobile Application Part (MAP) signalling network and an existing American National Standards Institute (ANSI-41) signalling network;

redirecting call delivery service for a user's mobile device from the home wireless network to a voice and data service provider's network that is independent of the home wireless network, the signalling network, and the visited wireless network;

receiving redirection information from the voice and data service provider's network and storing the received redirection information within the user's mobile device;

relocating the user's mobile device to a roaming area served by a visited wireless network;

passing the redirection information and billing resolution information from the user's mobile device to the visited wireless network;

associating the user's mobile device with the visited wireless network;

providing a first bypass network separate and distinct from the existing signalling network and the existing PSTN network;

communicating the association of the user's mobile device with the visited wireless network via the first bypass network to the voice and data service provider's network;

providing a second bypass network separate and distinct from the existing signalling network and the existing PSTN network;

delivering at least one redirected call responsive to the voice and data service provider's network via the second bypass network and via the visited wireless network to the user's mobile device; and resolving billing for the wireless call delivery service responsive to the billing resolution information.

2. The method as in claim 1, wherein the method is operational without requiring an existing GSM Memorandum of Understanding (MoU), and without requiring an existing ANSI-41 business roaming agreement, and without using the existing PSTN for call delivery from the voice and data service provider's network to the visited wireless network, and without using the existing PSTN for call delivery from the home wireless network to the visited wireless network, and without using the existing GSM MAP signalling network and without using the existing ANSI-41 signalling network.

3. The method as in claim 1, wherein the step of passing the redirection information and billing resolution information from the user's mobile device to the visited wireless network further comprises entering the billing resolution information into the user's mobile device for each delivered call.

4. The method as in claim 1, wherein the redirection information comprises at least a temporary Diffie-Hellman shared secret established between the user's mobile device and the visited wireless network.

5. The method as in claim 1, wherein the GSM MAP network is a Signalling System 7 (SS7) network.

6. The method as in claim 1, wherein the ANSI-41 network is a Signalling System 7 (SS7) network.

7. The method as in claim 1, wherein the step of redirecting call delivery further comprises providing the home wireless network with a forwarding phone number corresponding to the voice and data service provider's network.

8. The method as in claim 1, wherein the first bypass network is an Internet Protocol (IP) network.

9. The method as in claim 1, wherein the first bypass network and the second bypass network are the same bypass network.

10. The method as in claim 1, wherein the home air interface technology comprises at least one of Time Division Multiple Access (TDMA), Code Division Multiple Access (CDMA), and Global Systems for Mobile communications (GSM).

11. The method as in claim 10, wherein the home air interface technology additionally comprises an analog air interface.

12. The method as in claim 1, wherein the visited air interface technology comprises at least one of Time Division Multiple Access (TDMA), Code Division Multiple Access (CDMA), and Global Systems for Mobile communications (GSM).

13. The method as in claim 12, wherein the visited air interface technology additionally comprises an analog air interface.

14. The method as in claim 1, wherein the home air interface technology and the visited air interface technology each comprises at least one of Time Division Multiple Access (TDMA), Code Division Multiple Access (CDMA), and Global Systems for Mobile communications (GSM).

15. The method as in claim 14, wherein the home air interface technology and the visited air interface technology are different and mutually exclusive.

16. The method as in claim 15, wherein the user's mobile device operates in at least two wireless modes, said two modes corresponding respectively to the home air interface technology and the visited air interface technology.

17. The method as in claim 16, wherein the step of relocating the user's mobile device to a roaming area served by a visited wireless network further comprises switching the user's mobile device from operating in the wireless mode corresponding to the home air interface technology to the wireless mode corresponding to the visited air interface technology.

18. The method as in claim 1, wherein the step of passing the redirection information from the roaming user's mobile device to the visited wireless network further comprises:

arranging a temporary secure link between the user's mobile device and the visited wireless network, and using the temporary secure link to securely communicate the redirection information and billing resolution information from the user's mobile device to the visited wireless network.

19. The method as in claim 18, wherein the step of arranging a temporary secure link further comprises establishing a temporary Diffie-Hellman shared secret shared by the user's mobile device and the visited wireless network.

20. The method as in claim 19, wherein the billing resolution information identifies a credit card.

21. The method as in claim 20, wherein the step of passing the redirection information and billing resolution information from the user's mobile device to the visited wireless network further comprises entering the credit card identification into the user's mobile device.

22. The method as in claim 20, wherein the step of resolving billing further comprises:

accumulating charges for call delivery services in a billing server; and reconciling accumulated charges for call delivery services with a credit card billing server associated with the identified credit card.

23. The method as in claim 1, wherein the second bypass network is an Internet Protocol (IP) network.

24. The method as in claim 23, wherein the redirection information comprises at least an IP address of the voice and data service provider's network, and wherein the step of communicating the association further comprises contacting the voice and data service provider's network via the IP network responsive to the IP address.

25. The method as in claim 23, wherein the step of delivering redirected calls further comprises:

establishing an IP tunnel within the second bypass network, and delivering redirected calls from the voice and data service provider's network via the IP tunnel in the second bypass network to the visited wireless network.

26. The method as in claim 25, wherein the step of establishing an IP tunnel within the second bypass network further comprises communicating the IP address of an end of the IP tunnel within the visited wireless network to the voice and data service provider's network.

27. The method as in claim 25, wherein the step of establishing an IP tunnel within the IP network further comprises using Mobile IP protocol to track the varying location of the user's mobile device.

28. The method as in claim 25, wherein the step of delivering redirected calls from the voice and data service provider's network via the IP tunnel to the visited wireless network further comprises:

converting circuit calls at the voice and data service provider's network to packet data;

conveying packet data via the IP tunnel to the visited wireless network; and converting packet data at the visited wireless network to circuit calls.

29. The method as in claim 28, wherein the step of converting circuit calls at the voice and data service provider's network further comprises encoding circuit calls into packet data using H.323 protocol.

30. The method as in claim 28, wherein the step of converting packet data at the visited wireless network further comprises decoding packet data into circuit calls using H.323 protocol.

31. The method as in claim 25, wherein the step of delivering redirected calls from the voice and data service provider's network via the IP tunnel to the visited wireless network further comprises:
  converting circuit calls at the visited wireless network to packet data;
  conveying packet data via the IP tunnel to the voice and data service provider's network; and
  converting packet data at the voice and data service provider's network to circuit calls.

32. The method as in claim 31, wherein the step of converting circuit calls at the visited wireless network further comprises encoding circuit calls into packet data using H.323 protocol.

33. The method as in claim 31, wherein the step of converting packet data at the voice and data service provider's network further comprises decoding packet data into circuit calls using H.323 protocol.

34. A system to provide billing resolution and basic wireless call delivery service for a roaming user's mobile device, between a home wireless network and a visited wireless network, the system comprising:
  a user's mobile device,
  a home wireless network, coupled to both an existing Public Switched Telephony Network (PSTN) and a signalling network comprising at least one of an existing Global Systems for Mobile communication (GSM) Mobile Application Part (MAP) signalling network and an existing American National Standards Institute (ANSI-41) signalling network;
  a voice and data service provider's network;
  redirecting call delivery means to redirect call delivery service from the home wireless network to the voice and data service provider's network;
  a visited wireless network; and
  bypass network means coupling the visited wireless network and the voice and data service provider's network, wherein the bypass network means is separate and distinct from the existing signalling network and the existing PSTN network;
  wherein the user's mobile device comprises at least:
    home wireless network operating means to provide for operating within the home wireless network;
    visited wireless network operating means to provide for operating within the visited wireless network; and
    storage means for storing redirection information; and
  wherein the visited wireless network comprises association means for associating the user's mobile device with the visited wireless network and billing resolution means for resolving billing for the wireless call delivery service.

35. The system as in claim 34, wherein the GSM MAP network is a Signalling System 7 (SS7) network.

36. The system as in claim 34, wherein the ANSI-41 network is a Signalling System 7 (SS7) network.

37. The system as in claim 34, wherein the system is operational without requiring an existing GSM Memorandum of Understanding (MoU) and without requiring an existing ANSI-41 business roaming agreement, and without using the existing PSTN for call delivery from the voice and data service provider's network to the visited wireless network, and without using the existing PSTN for call delivery from the home wireless network to the visited wireless network, and without using the existing GSM MAP signalling network and without using the existing ANSI-41 signalling network.

38. The system as in claim 34, wherein the home wireless network and the visited wireless network each comprise at least one of a Time Division Multiple Access (TDMA) wireless network, a Code Division Multiple Access (CDMA) wireless network, and a Global Systems for Mobile communications (GSM) wireless network, wherein the home wireless network and the visited wireless network are different and mutually exclusive.

39. The system as in claim 34, wherein the user's mobile device further comprises means to select between the home wireless network operating means and the visited wireless network operating means.

40. The system as in claim 34, wherein the home wireless network is one of a Time Division Multiple Access (TDMA) wireless network, a Code Division Multiple Access (CDMA) wireless network, and a Global Systems for Mobile communications (GSM) wireless network.

41. The system as in claim 40, wherein the home wireless network additionally comprises an analog wireless network.

42. The system as in claim 34, wherein the visited wireless network is one of a Time Division Multiple Access (TDMA) wireless network, a Code Division Multiple Access (CDMA) wireless network, and a Global Systems for Mobile communications (GSM) wireless network.

43. The system as in claim 42, wherein the visited wireless network additionally comprises an analog wireless network.

44. The system as in claim 34, wherein the user's mobile device further comprises temporary secure link means to provide for securely communicating redirection information and billing resolution information from the user's mobile device to the visited wireless network.

45. The system as in claim 44, wherein the temporary secure link means further comprises a Diffie-Hellman shared secret means for providing a temporary Diffie-Hellman secret shared by the user's mobile device and the visited wireless network.

46. The system as in claim 44, wherein the billing resolution information identifies a credit card.

47. The system as in claim 46, wherein the user's mobile device further comprises means to enter the identification of the credit card.

48. The system as in claim 47, wherein the means to enter the identification of the credit card comprises a keypad.

49. The system as in claim 47, wherein the means to enter the identification of the credit card comprises a credit card reader.

50. The system as in claim 47, wherein the billing resolution means further comprises:
  a billing server for accumulating charges for call delivery services;
  a credit card billing server comprising at least an account associated with the identified credit card; and
  means to reconcile the accumulated charges for call delivery services against the account associated with the identified credit card.

51. The system as in claim 34, wherein the redirection information comprises at least a temporary Diffie-Hellman shared secret established between the user's mobile device and the visited wireless network.

52. The system as in claim 51, wherein the redirection information comprises at least an IP address of the voice and data service provider's network.

53. The system as in claim 34, wherein the bypass network is an Internet Protocol (IP) network.

54. The system as in claim 53, wherein the IP network further comprises an IP tunnel.

55. The system as in claim 34, wherein the bypass network further comprises an IP tunnel.

56. The system as in claim 55, wherein the IP tunnel is comprised of a first end within the voice and data service provider's network, and a second end within the visited wireless network.

57. The system as in claim 55, wherein the voice and data service provider's network further comprises Mobile IP means to track the varying location of the user's mobile device.

58. The system as in claim 55, wherein the voice and data service provider's network further comprises:

circuit call conversion means for converting circuit calls at the voice and data service provider's network to packet data; and packet data conversion means for converting packet data at the voice and data service provider's network to circuit calls.

59. The system as in claim 58, wherein the circuit call conversion means is an H.323 server.

60. The system as in claim 58, wherein the packet data conversion means is an H.323 server.

61. The system as in claim 55, wherein the visited wireless network further comprises:

circuit call conversion means for converting circuit calls at the visited wireless network to packet data; and packet data conversion means for converting packet data at the visited wireless network to circuit calls.

62. The system as in claim 61, wherein the circuit call conversion means is an H.323 server.

63. The system as in claim 61, wherein the packet data conversion means is an H.323 server.

64. The system as in claim 56, wherein the first end further comprises a respective first end IP address, and the second end further comprises a respective second end IP address.

\* \* \* \* \*